United States Patent
Yeskel et al.

(10) Patent No.: US 8,706,733 B1
(45) Date of Patent: Apr. 22, 2014

(54) AUTOMATED OBJECTIVE-BASED FEATURE IMPROVEMENT

(75) Inventors: Zach Yeskel, San Francisco, CA (US); David Andrew Huffaker, Palo Alto, CA (US); Rachel Ida Rosenthal Schutt, New York, NY (US); Andrew Stephen Tomkins, Menlo Park, CA (US); David Andrew Gibson, Mountain View, CA (US); Abhijit Bose, Paramus, NJ (US); Alexander Fabrikant, East Palo Alto, CA (US); Makoto Uchida, Mountain View, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/560,874

(22) Filed: Jul. 27, 2012

(51) Int. Cl.
*G06F 7/00* (2006.01)
*G06F 17/30* (2006.01)

(52) U.S. Cl.
USPC .............. 707/737; 706/47; 715/234; 715/253

(58) Field of Classification Search
CPC . G06F 17/212; G06F 17/248; G06F 17/3089; G06F 17/30899; G06F 17/30253; G06F 17/30259; G06F 17/30663; G06F 17/30864; G06N 5/04; G01R 31/3016
USPC .......................................................... 707/737
See application file for complete search history.

(56) References Cited

U.S. PATENT DOCUMENTS

| | | | |
|---|---|---|---|
| 7,321,883 B1 * | 1/2008 | Freedy et al. | 706/45 |
| 7,321,885 B2 * | 1/2008 | Loh | 706/47 |
| 7,844,894 B2 * | 11/2010 | Khopkar et al. | 715/234 |
| 2006/0044339 A1 * | 3/2006 | Mizutani et al. | 347/15 |
| 2006/0064339 A1 * | 3/2006 | Allred | 705/9 |
| 2007/0008044 A1 * | 1/2007 | Shimamoto | 331/57 |
| 2007/0021886 A1 * | 1/2007 | Miyajima | 701/37 |
| 2007/0094198 A1 * | 4/2007 | Loh | 706/47 |
| 2007/0271511 A1 * | 11/2007 | Khopkar et al. | 715/540 |
| 2008/0071741 A1 * | 3/2008 | Omi et al. | 707/3 |
| 2012/0078908 A1 * | 3/2012 | Djordjevic et al. | 707/737 |
| 2013/0191450 A1 * | 7/2013 | Bodenhamer et al. | 709/203 |

* cited by examiner

*Primary Examiner* — Binh V Ho
(74) *Attorney, Agent, or Firm* — McDermott Will & Emery LLP

(57) ABSTRACT

A system and method for facilitating automatic objective-based feature improvement, the method including receiving a request to identify an optimal alternative for each of one or more features of a computer-implemented entity, determining an alternative feature range for each of the one or more features, the alternative feature range defining a range of possible alternative features available with respect to the feature, selecting one or more alternative features for each feature from the alternative feature range of the feature, generating a plurality of alternative sets, each including an alternative feature for at least one of the one or more features, selecting a plurality of user groups from a pool of users and assigning each user group of the plurality of users groups to one of the plurality of alternative sets based on user characteristics of the users and historical information regarding the interaction of the user with the computer-implemented entity.

21 Claims, 5 Drawing Sheets

AUTOMATED OBJECTIVE-BASED FEATURE IMPROVEMENT

BACKGROUND

To maximize usability and benefits of features of computer implemented entities, experiments are configured to determine the best features and feature characteristics to provide to users of the computer implemented entity. These experiments involve a series of alternative features for each of one or more features of the computer-implemented entity. The alternative features are presented to users and the behavior of the users with respect to the alternative features is received and analyzed to determine those alternative(s) that maximize the usability and productivity of the computer-implemented entity.

Currently, the experiment process is performed manually. This manual process requires relying on human intuition when grouping the users and selecting the alternative features for testing. Furthermore, because the alternative features are selected and analyzed manually, it becomes increasingly difficult to select and analyze experiments with alternative sets for testing joint features (e.g., adjusting content distribution and UI elements provided to a user). Additionally, it is difficult to adjust the experiment elements during the experiment as the selection of alternative features may only be adjusted manually, after the user has viewed the results of the interaction of user groups with respect to their alternative sets.

SUMMARY

The disclosed subject matter relates to a computer-implemented method for facilitating automatic objective-based feature improvement, the method comprising receiving, using one or more computing devices, a request to perform an experiment with respect to a computer-implemented entity to identify an optimal alternative for each of one or more features of the computer-implemented entity. The method further comprising determining, using the one or more computing devices, an alternative feature range with respect to each of the one or more features, the alternative feature range defining a range of possible alternative features available with respect to the feature. The method further comprising selecting, using the one or more features, one or more alternative features for each of the one or more features, each alternative feature being selected from the alternative feature range of the feature. The method further comprising generating, using the one or more computing devices, a plurality of alternative sets, each alternative set including an alternative feature for at least one of the one or more features. The method further comprising selecting, using the one or more computing devices, a plurality of user groups from a pool of users and assigning, using the one or more computing devices, each user group of the plurality of users groups to one of the plurality of alternative sets, wherein the assigning is based on user characteristics of each user and historical information regarding the interaction of that user with the computer-implemented entity.

The disclosed subject matter also relates to a system for facilitating automatic objective-based feature improvement, the system comprising one or more processors and a machine-readable medium comprising instructions stored therein, which when executed by the processors, cause the processors to perform operations comprising receiving an indication of a request to perform an experiment with respect a computer-implemented entity to identify an optimal alternative for each of one or more features of the computer-implemented entity, the optimal alternative comprising an alternative for each feature that provides the highest likelihood of resulting in an objective associated with the experiment. The operations further comprising determining, using the one or more computing devices, an alternative feature range with respect to each of the one or more features, the alternative feature range defining a range of possible alternative features available with respect to the feature. The operations further comprising selecting, using the one or more computing devices, a plurality of alternative features for each of the one or more features from the alternative feature range associated with the feature and generating a plurality of alternative sets, each alternative set including at least one alternative of the plurality of alternative features for at least one of the one or more features. The operations further comprising identifying a pool of users available to participate in the experiment and generating a plurality of user groups by grouping the users of the identified pool of users, the plurality of user groups being generated based on the characteristics of each user of identified pool of users, wherein the number of user groups is equal to the number of alternative sets. The operations further comprising assigning, using the one or more computing devices, each user group of the plurality of users groups to one of the plurality of alternative sets, wherein the assigning is based on user characteristics of users of each user group.

The disclosed subject matter also relates to a machine-readable medium comprising instructions stored therein, which when executed by a machine, cause the machine to perform operations comprising receiving an indication of a request to perform an experiment with respect a computer-implemented entity to identify an optimal alternative for each of one or more features of the computer-implemented entity, the optimal alternative being an alternative having the highest correlation with an objective identified with respect to the computer-implemented entity. The operations further comprising automatically generating an experiment to determine the optimal alternative for each of the one or more features, the generating comprising determining, using the one or more computing devices, an alternative feature range with respect to each of the one or more features, the alternative feature range defining a range of possible alternative features available with respect to the feature. The generating further comprising selecting, using the one or more computing devices, a plurality of alternative features for each of the one or more features from the alternative feature range associated with the feature and generating a plurality of alternative sets, each alternative set including at least one alternative of the one or more alternative features for at least one of the one or more features. The generating further comprising identifying a pool of users available to participate in the experiment. The generating further comprising generating a plurality of user groups by grouping the users of the identified pool of users, the user groups being generated based on the characteristics of the users of identified pool of users, wherein the number of user groups is equal to the number of alternative sets and assigning, using the one or more computing devices, each user group of the plurality of users groups to one of the plurality of alternative sets, wherein the assigning is based on user characteristics of the users of each user group. The operations further comprising receiving an indication of user activity for each of the users of the plurality user groups, for the duration of the experiment and providing feedback regarding the optimal alternative for each of the one or more features when it is determined that the experiment has terminated based on analyzing the received user activity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
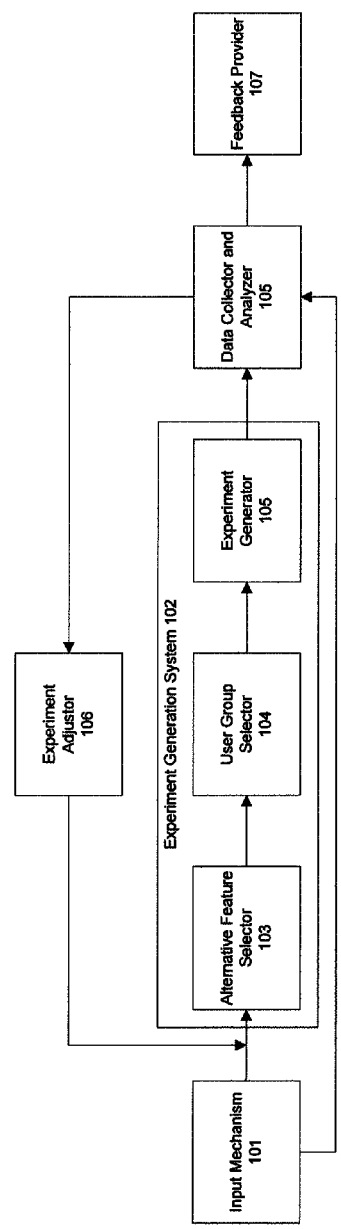
FIG. 1 illustrates an example block diagram of a system which provides for facilitating automated objective-based feature improvement.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure facilitates automating the process of objective-based feature improvement. The automated system receives a specific experiment objective (e.g., a result with respect to each of one or more features being tested being tested as part of the experiment) and an alternative feature range for each feature being tested. Features of the computer implemented entity may include performance based features such as content variations presented to the user in search results, recommendations and suggestions provided to users (e.g., for content, friends), user interface based features such as variations in graphical user interface elements displayed to users, or other features which improve user satisfaction and further maximize the effectiveness of the content (e.g., click through rate, number of users returning to a website, or users taking other intended actions). Each feature being tested provides a variation on the user experience, such that the system reconfigures the user experience with respect to the computer-entity according to the feature variation.

The objective identifies one or more goals with respect to the performance of the computer-implemented entity and/or one or more features of the computer-implemented entity. Each goal represents an objective (e.g., click through rate, time spent on the program, or other similar user activity with respect to the computer-implemented entity) which is desired to be met based on reconfigurations of the user experience with respect to the computer-implemented entity. The alternative feature range for each feature defines a space including a set of alternative values or variations for each feature (e.g., a distribution breakdown range, a listing of UI features or similar range of alternative features available with respect to a feature). In one example, the experiment may also be assigned a priority (e.g., an indication that an objective is important and thus should be prioritized over other experiments regarding other objectives). The priority may be assigned manually by the engineer conducting the experiment, similar to the objective and alternative feature ranges. In another example, the system may determine a priority for the experiment according to historical information regarding the value of each objective in overall maximization of user experience, maximization of profits and/or overall performance of the computer-implemented entity.

The system automatically generates an experiment according to the objective, features to be tested, the alternative feature range for each feature and/or the priority for each experiment. To generate the experiment, the system selects a number of alternative features from the identified alternative feature range for each feature being tested. The selection of the alternative features is based upon the number of users available for the experiment, the number of alternative features likely to provide enough comparison and generate enough data for a determination, and/or prior knowledge of information relating to the experiment, the objectives, the alternative feature range an/or the specific feature being tested. For example, the system may have access to information (e.g., data and/or results from prior studies and/or performance logs) regarding each feature being tested and may determine the optimal delineation and number of alternative features within the alternative feature range based on such information. Once the system has selected alternative features for each feature being tested, the system generates alternative sets, each alternative set including at least one alternative for each feature being tested. In one example, the alternative sets include the possible combinations for testing all alternative features for the one or more features. In one example, all possible combinations may be tested, while in other embodiments, only certain combinations are tested.

The system also identifies a pool of users available for the specific experiment. When selecting the pool of users, the system may be limited by various considerations including, for example, other ongoing experiments. The users available for the experiment may vary based on the priority assigned to the experiment. The identified pool of users may be grouped to create user groups, based on the number of the alternative sets. In one example, the grouping of the users is based upon an algorithm that minimizes any bias across the groupings and creates sample groups of users that have same or similar characteristics and behavior at least with respect to the feature(s) included as part of the objective. The user groups may be determined based on user characteristics of the users (e.g., historically observed user characteristics stored within a user profile). Each user group is assigned to a specific alternative set. User groups may be assigned to an alternative set based on user characteristics of the users within the user group (e.g., historically observed user characteristics stored within a user profile). For example, a user group may be assigned to an alternative set based on a determination of a projection of how well the users within the group are likely to respond to the alternative set (e.g., based on various user characteristics and/or historical information). The assignment of each user to a specific alternative set causes the experience of the user with respect to the computer-implemented entity to be reconfigured according to the specific features of the set.

Once the user groups are assigned to the alternative sets, the experiment is initiated. During the experiment, the system receives indication of user activity of the users within each user group with respect to their respective alternative set. That is, the user interacts with the computer-implemented entity having been reconfigured according to the feature alternatives assigned to the user, and the user interaction with respect to the reconfigured experience of the computer-implemented entity is received by the system.

The user activity is analyzed by the system to determine an improvement score for each alternative set and/or one or more alternative features associated with one or more of the features being tested. The improvement score may be calculated based on the effect of the alternative features and/or alternative sets on the user's interaction with the computer-implemented entity (e.g., product or service), and may be further based on the correlation of the user behavior with the desired objectives of the experiment. In one example, the improvement score is an indication of the correlation of the alternative set to achieving an objective of the experiment. The improvement score may be a score given to each alternative set according to the extent to which the user activity with respect to the alternative entity contributes to the objective of the experiment. In one example, the objective of the experiment may include one or more results (e.g., click-through rate, user engagement, duration of user engagement with the service or product, user rating, user satisfaction, the number of user visits, etc.) where each result has a corresponding value, and where the improvement score is calculated based on the results achieved in view of the alternative set being applied to the computer-implemented entity. The calculated improvement score is used to provide results regarding the experiment. Furthermore, the calculated improvement score for the various alternative features and/or alternative sets may be used to dynamically adjust the alternative sets, groupings of users and/or the assignment of user groups to alternative sets while the experiment is ongoing.

Based on the received user activity, the system may determine that with respect to one or more features from the initial set of alternative features and/or alternative sets, a number of the alternative features and/or alternative sets are the most likely to be selected as the optimal alternative. The system may then generate adjusted alternative sets, user groupings and/or assignment of user groups to alternative sets in response to determining that adjustments are necessary and/or desirable to improve the experiment.

In one example, the system may expand one or more alternative sets, group one or more alternative sets, removing one or more alternative sets and/or adding one or more additional alternative sets. Similar adjustments may be made with respect to only a single feature. The system may also generate adjusted user groups including varying the grouping of users, number of users within each user group or expanding or collapsing one or more users group. In one example the system may adjust the user groups such that the number of user groups after the adjustment is equal to the number of alternative sets once adjustment has occurred. Furthermore, the assignment of users to groups may be adjusted such that users are assigned to groups and/or alternative sets based on a prediction of how each user and/or user group is likely to respond to the adjusted alternative set(s).

The determination of whether an adjustment should be made may be performed periodically or may be triggered as a result of one or more conditions being met. The criteria for determining whether adjustments should be made may include a pre-defined degree of separation between the improvement scores of the alternative features for each features and/or among the alternative sets, a certain confidence or improvement score of one or more alternative sets and/or other similar indications derived from the user activity indicating that an adjustment may be beneficial in reaching a decision as to the optimal alternative for each feature. The adjustment process may occur one or more times during the experiment.

The system continues to collect information regarding user behavior with respect to the variations (alternative features) for the one or more features until it determines that the experiment has reached its point of termination, where all data collected during the experiment is provided for analysis. The system may periodically perform a check to determine whether the point of termination has been reached.

In one example, the system may determine that the system has reached its point of termination based on one or more termination criteria (e.g., conditions that when met indicate that the experiment should be terminated). The termination criteria may include a pre-defined degree of separation between the improvement scores of the alternative features for each feature and/or among the alternative sets, a certain confidence or improvement score of one or more alternative sets and/or other similar indications derived from the user activity indicating that the experiment should be terminated. Alternatively, the determination as to whether the experiment should be made, may be based on system or user-indicated conditions such as a certain time period having lapsed since the start of the experiment, a pre-defined time or point of termination, a limit on the resources (e.g., money, time, users) allocated to the experiment and/or whether resources allocated to the termination are needed for other experiments (e.g., those with higher priority).

At the termination of the experiment, the system analyzes all received activity from users with respect to the features of the computer-implemented entity and analyzes the data to provide a determination. The results of the experiment may include a decision as to the optimal alternative (e.g., for each feature or for all features being tested collectively), an indication to the user that there is no actual preferred or optimal alternative (e.g., for each feature or for all features being tested collectively), and/or a determination that while it is likely that an optimal alternative exists, further experimentation is necessary to reach a definitive decision. The criteria for generating the results and/or identifying the optimal alternative features may be based on various criteria or conditions (e.g., system or user-indicated conditions or thresholds) and may include a required difference between the improvement score of the alternative(s) being tested and the current alternative in use, an error threshold of the determination (e.g., of the improvement score(s) or difference between those improvement scores), and/or a degree of confidence in the determination.

II. Example Automated Objective-Based Feature Improvement Systems

FIG. 1 illustrates an example block diagram of a system which provides for facilitating automated objective-based feature improvement. The system includes an input mechanism 101 communicably coupled to an experiment generation system 102 including an alternative feature selector 103, a user group selector 104, and an experiment generator 105. The experiment generation system is further coupled to a data collector and analyzer 106. The system 100 further includes an adjustment generator 107 and a feedback generator 108. The input mechanism 101 receives a set of inputs from a user (e.g., engineer) requesting to perform an automated objective-based feature improvement experiment with respect to one or more features of a computer-implemented entity. The input received at the input mechanism 101 may include, for example, a specific experiment objective (e.g., a result with respect to each of one or more features being tested being tested as part of the experiment), an alternative feature range for each feature being tested and/or a priority for the experiment.

The input data received at the input mechanism 101 are forwarded to the experiment generation system 102. The experiment generation system 102 generates an experiment based on the received data and conducts the experiment. The experiment generation system 102 includes an alternative feature selector 103, a user group selector 104 and an experiment generator 105. The alternative feature selector 103 is configured to select a number of alternative features for each feature being tested and generate one or more alternative sets from the selected alternative features. The user group selector 104 is configured to identify a pool of users available for the experiment and generate user groups from the pool of users (e.g., wherein the number of user groups generated by the user group selector 104 is dependent upon the number of alternative sets generated by the alternative feature selector 103). The experiment generator 105 is configured to receive the alternative sets generated by the alternative feature selector 103 and the user groups generated by the user group selector 104 and generate an experiment by assigning each user group to a specific alternative set and initialize the experiment.

The data collector and analyzer 106 is configured to collect and store activity data relating to received indication of user activity of each user participating in the experiment with respect to each alternative set. The data collector and analyzer 106 is further configured to analyze the collected user activity to generate feedback regarding the experiment. The received activity may be used during the duration of the experiment to determine an improvement score for each alternative set and/or one or more alternative features associated with one or more of the features being tested. The calculated improvement score may be used to determine whether the experiment should be adjusted.

The adjustment generator 107 is configured to dynamically adjust the experiment, including one or more of the alternative sets, groupings of users and/or the assignment of user groups to alternative sets, based on information and/or data received from the data collector and analyzer 106. The determination as to when adjustment is needed (e.g., point of adjustment) may be performed by the data collector and analyzer 106 and/or the adjustment generator 107.

The data collector and analyzer is further configured to analyze the data and provide information regarding the collected data (e.g., improvement score for each alternative or alternative set) and/or analysis of the collected data to the feedback provider 108 which provides the user (e.g., engineer) requesting the experiment with feedback or results regarding the experiment. The results of the experiment may be generated at the data collector and analyzer 106 and/or the feedback provider 108 and is provided to the user at the termination of the experiment. The determination as to when the experiment should be terminated may be performed by the data collector and analyzer 106 and/or the feedback provider 108.

Figure 2:
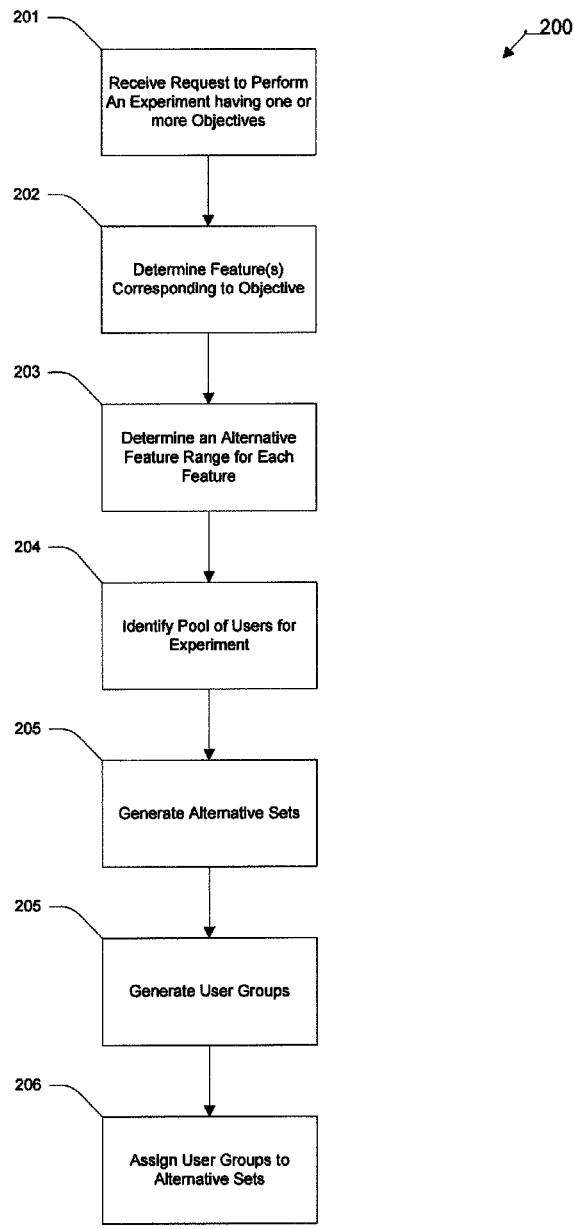
FIG. 2 illustrates an example process for generating an experiment.

III. Example Processes for Generating and Conducting an Automated Feature Improvement Experiment FIG. 2 illustrates an example process 200 for generating an experiment. In block 201, the system receives an indication of a request to generate an experiment. In one example, the request may be a request from a user to generate a new experiment (e.g., an engineer requesting to conduct an automated feature-based improvement experiment) or may be a system request (e.g., from the experiment adjustor 107) to generate an adjusted experiment for an ongoing experiment. In block 202, the system determines the features of the computer-implemented entity being tested according to the objective of the experiment. In one example, the objective of the experiment is provided as an input by a user and includes one or more features that are to be tested.

In block 203, the system determines an alternative feature range for each of the one or more features being tested. In one example, the alternative feature range for each feature being tested is provided as a user input and defines a range of values for alternative features that may be tested with respect to a specific feature. In block 204, the system identifies a pool of user for the experiment. The pool of users may be selected from a pool of users of the computer-implemented entity available to take part in an experiment. The pool of users may be selected specifically based on the features being tested and the selection may be based on the user characteristics and features, as well as system or user-indicated criteria regarding the users or types of users that are optimal for the experiment.

In block 205, the system generates one or more alternative sets for the experiment. The alternative sets are generated according to the objective and the alternative feature ranges provided for each feature being tested. To generate the alternative sets the system selects a number of alternative features from the identified alternative feature range for each feature being tested. Each alternative may include a variation of the feature being tested (e.g., a variation on an existing feature of a computer-implemented service or product being offered to the users). The selection of the alternative features may be based upon the number of users available for the experiment, the number of alternative features likely to provide enough comparison and generate enough data for a definitive result, and/or prior knowledge of information relating to the experiment, the objectives, the alternative feature range or the specific feature. The system then generates alternative sets, each alternative set including at least one alternative for each feature being tested.

Next, in block 206, the pool of users identified in block 204 are grouped together to generate user groups (e.g., based on the number of the alternative sets). In one example, the grouping of the users is based upon an algorithm that minimizes any bias across the groupings and creates sample groups of users that have same or similar characteristics and behavior at least with respect to the feature(s) included as part of the objective. The user groups may be determined based on user characteristics of the users (e.g., historically observed user characteristics stored within a user profile).

In block 207, each user group generated in block 206 is assigned to a specific alternative set generated in block 205. User groups may be assigned to an alternative set based on user characteristics of the users within the user group (e.g., historically observed user characteristics stored within a user profile).

At this stage, the experiment is ready for initiation and the system begins collecting information regarding user behavior with regard to the variations on the features to determine the best or optimal features that achieve the objectives of the experiment.

Figure 3:
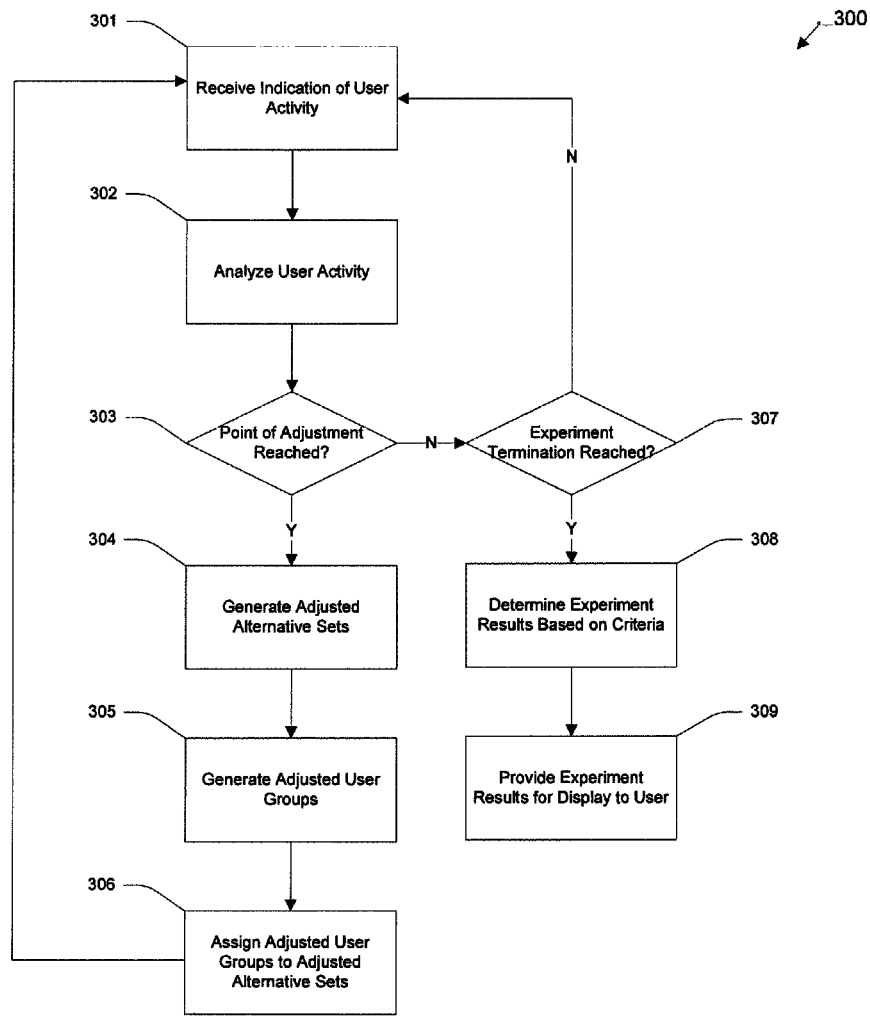
FIG. 3 illustrates a flow chart of an example process for automatically conducting a feature-based improvement experiment.

FIG. 3 illustrates a flow chart of an example process 300 for automatically conducting a feature-based improvement experiment. In block 301, the system receives an indication of user activity with respect to the alternative set assigned to the user (i.e., the feature variations presented to the user as part of the user experience with respect to the computer-implemented entity). In block 302, the system analyzes the received user activity to determine an improvement score for each alternative set and/or one or more alternative features associated with one or more of the features being tested. The calculated improvement score may be used when generating the results of the experiment and/or to dynamically adjust the alternative sets, groupings of users and/or the assignment of user groups to alternative sets during the experiment.

In one example, in response to the analyzing of the received user activity in block 302, the system may, in block 303, determine if the experiment has reached a point of adjustment at which it is beneficial or necessary to adjust some variables of the experiment.

If, in block 303 the system determines that a point of adjustment has been reached (e.g., that an adjustment to one or more variables of the experiment, such as the alternative features, alternative sets, users or user groupings is desirable or necessary for optimizing the experiment), the process continues to block 304. In block 304, the system generates adjusted alternative sets (e.g., expanding one or more alternative sets, grouping one or more alternative sets, removing one or more alternative sets and/or adding one or more additional alternative sets).

In block 305, the user groupings and/or assignment of user groups may also be adjusted. In block 306, assignment of user groups and alternative sets is adjusted to account for the adjustments of the alternative features, alternative sets, users and/or user groups. The adjustment process is then completed and the process returns to block 301 and resumes the process of receiving indication of user activity and analyzing the user activity.

If, in block 303, the system determines that a point of adjustment has not been reached and/or that an adjustment is not needed, the process continues to block 307 and determine whether the experiment has reached its termination. The system may periodically perform a check to determine whether the point of termination has been reached. In one example, the system may determine that the system has reached its point of termination based one or more conditions indicating that the experiment should be terminated, including whether certain results have been achieved (e.g., improvement scores, confidence, etc.) or whether a termination event has occurred (e.g., time elapsed, resources spent, etc.).

If the system determines that the experiment has not yet reached termination, the process returns to block 301. Otherwise, if, in block 307, the system determines that the experiment has reached the point of termination, the process continues to block 308 and determines experiment results. Once the system determines that the experiment has reached its point of termination, all data collected during the experiment is provided for analysis. At the termination of the experiment, the system analyzes all received activity from users with respect to the features of the computer-implemented entity and analyzes the data to provide the user with feed-back regarding the experiment.

In block 309, the system may provides the experiment results in the form of one or more determinations relating to the experiment and/or features being tested for display to a user requesting the experiment (e.g., engineer).

Figure 4:
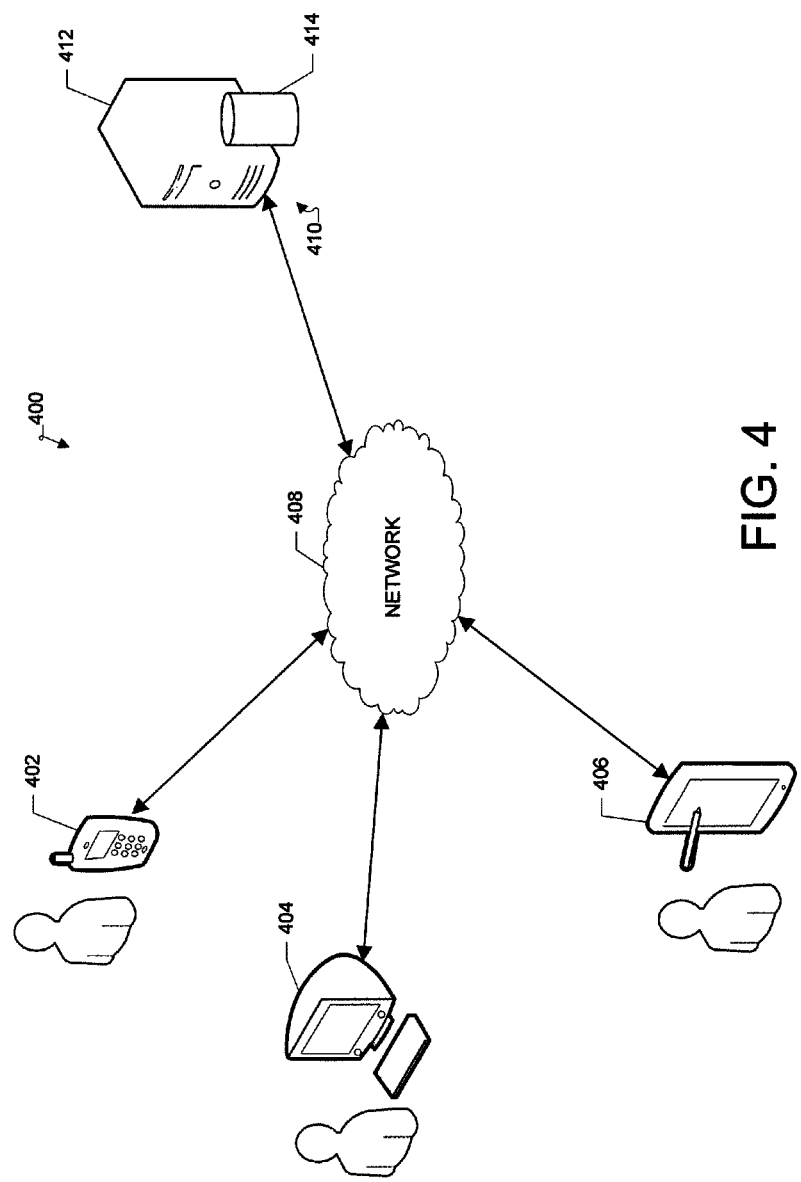
FIG. 4 illustrates an example client-server network environment which provides for implementing an automated objective-based feature improvement system and process.

IV. Example Electronic Systems for Implementing an Automated Objective-Based Feature Improvement FIG. 4 illustrates an example client-server network environment which provides for implementing an automated objective-based feature improvement system and process. A network environment 400 includes a number of electronic devices 402, 404 and 406 communicably connected to a server 410 by a network 408. Server 410 includes a processing device 412 and a data store 414. Processing device 412 executes computer instructions stored in data store 414, for example, to assist in implementing an automated objective-based feature improvement system and process at electronic devices 402, 404 and 406.

In some example embodiments, electronic devices 402, 404 and 406 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 4, electronic device 402 is depicted as a smartphone, electronic device 404 is depicted as a desktop computer, and electronic device 406 is depicted as a PDA.

In some example aspects, server 410 can be a single computing device such as a computer server. In other embodiments, server 410 can represent more than one computing device working together to perform the actions of a server computer (e.g., cloud computing). The server 410 may host the web server communicationally coupled to the browser at the client device (e.g., electronic devices 402, 404 or 406) via network 408.

The network 408 can include, for example, any one or more of a personal area network (PAN), a local area network (LAN), a campus area network (CAN), a metropolitan area network (MAN), a wide area network (WAN), a broadband network (BBN), the Internet, and the like. Further, the network 408 can include, but is not limited to, any one or more of the following network topologies, including a bus network, a star network, a ring network, a mesh network, a star-bus network, tree or hierarchical network, and the like.

An experiment may be requested by a user at a client device (e.g., electronic devices 102, 104 or 106). The system (e.g., hosted at server 110) may generate the experiment, including selecting a pool of users (e.g., users interacting with electronic devices 102, 104 and 106) and assigning a set of alternative features (i.e., variations of features being tested as part of the experiment) to the users, such that the experience of the user with respect to the computer-implemented entity (i.e., product or service) which is the subject of the experiment. The system at server 110 receives user activity with respect to the alternative sets and generates feed-back regarding the experiment for display to the user (e.g., user interacting with one or more of the electronic devices 102, 104 and 106).

V. Example Electronic Systems for Implementing an Automated Objective-Based Feature Improvement Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
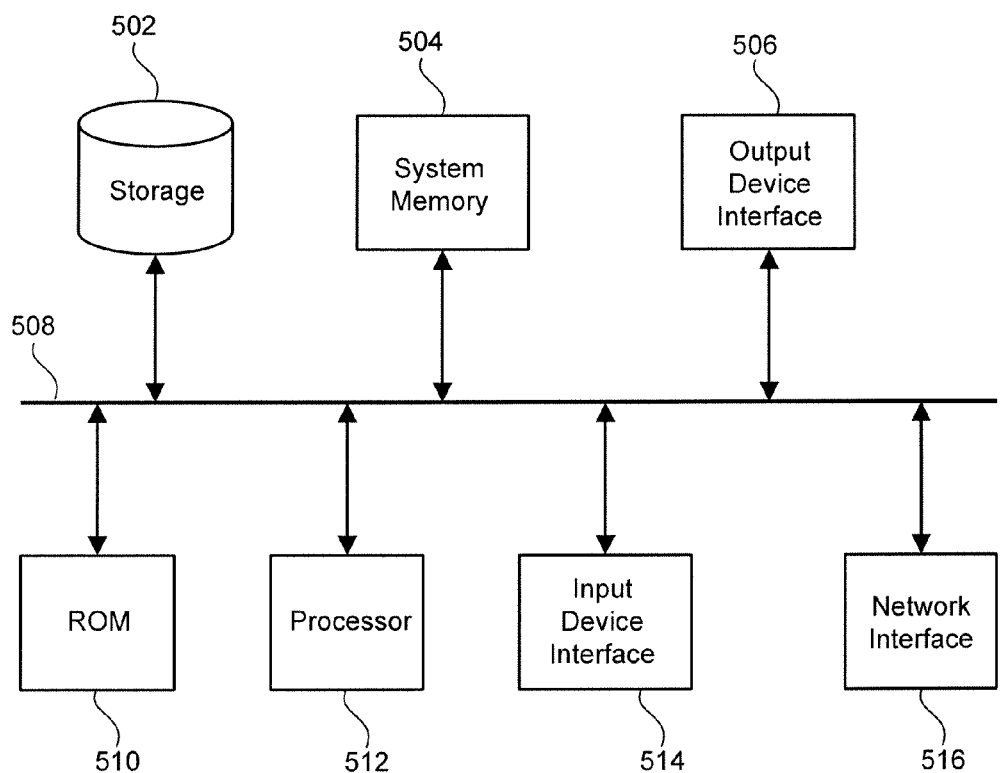
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for facilitating an automated objective-based feature improvement experiment. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for facilitating automatic objective-based feature improvement, the method comprising:
receiving, using one or more computing devices, a request to perform an experiment with respect to a computer-implemented entity to identify an improved alternative for each of one or more features of the computer-implemented entity;
determining, using the one or more computing devices, an alternative feature range with respect to each of the one or more features, the alternative feature range defining a range of possible alternative features available with respect to the feature;
selecting, using the one or more features, one or more alternative features for each of the one or more features, each alternative feature being selected from the alternative feature range of the feature;
generating, using the one or more computing devices, a plurality of alternative sets, each alternative set including an alternative feature for at least one of the one or more features;
selecting, using the one or more computing devices, a plurality of user groups from a pool of users;
assigning, using the one or more computing devices, each user group of the plurality of users groups to one of the plurality of alternative sets, wherein the assigning is based on user characteristics of each user and historical information regarding the interaction of that user with the computer-implemented entity;
receiving an indication of user activity of users within each user group with respect to the computer-implemented entity; and
analyzing the received activity for each user group to determine an improvement score for the alternative set.

2. The method of claim 1, wherein the number of user groups of the plurality of user groups is equal to the number of alternative sets of the plurality of alternative sets.

3. The method of claim 1, wherein each alternative feature for each feature comprises a variation of the experience of the user with regard to the feature when interacting with the computer-implemented entity.

4. The method of claim 1, further comprising:
identifying, using the one or more computing devices, a pool of users for performing the experiment based on one or more of a priority of the experiment, the number of users of the computer-implemented entity available to participate in the experiment or characteristics of the users of the computer-implemented entity.

5. The method of claim 1, wherein the improvement score is an indication of the correlation of the alternative set to achieving an objective of the experiment and wherein the improvement score is calculated based on the extent to which the user activity with respect to the alternative entity contributes to the objective of the experiment.

6. The method of claim 5, wherein the objective of the experiment is identified by a user requesting the experiment.

7. The method of claim 1, further comprising:
determining that an adjustment event has occurred with respect to the experiment;
generating 1) a plurality of adjusted alternative sets according to the improvement score for each of the plurality of alternative sets, and 2) a plurality of adjusted users groups, the number of adjusted user groups of the plurality of adjusted user groups being equal to the number of adjusted alternative sets of the plurality of adjusted alternative sets; and
assigning each adjusted user group of the plurality of adjusted users groups to one of the plurality of adjusted alternative sets.

8. The method of claim 7, wherein determining that an adjustment event has occurred comprises, determining that a pre-defined condition with respect to the experiment has occurred, wherein the pre-defined condition provides an indication that an adjustment to the experiment should be performed.

9. The method of claim 1, further comprising:
providing feedback regarding the experiment for display to a user requesting the experiment, wherein the feedback for each of the one or more features comprises a determination of an optimal alternative feature for the feature, an indication that an optimal alternative feature is not determined for the feature or an indication that further experimentation is necessary to arrive at a determination of an optimal alternative feature for the feature.

10. The method of claim 9, wherein the feedback is provided based on an improvement score calculated for each of the one or more alternative sets.

11. The method of claim 9, wherein the feedback is selected based on one or more pre-defined criteria provided, the pre-defined criteria comprising one or more of a threshold difference between the improvement score of the current feature and each alternative feature, a threshold confidence score for the determined improvement score for each alternative set and alternative feature, or an error threshold for the improvement score for each alternative set.

12. The method of claim 9, further comprising:
determining whether the experiment is at a point of termination, the determining comprising determining whether the experiment meets one or more pre-defined termination conditions;
terminating the experiment in response to determining that the experiment is at a point of termination; and
providing the feedback in response to terminating the experiment.

13. The method of claim 1, wherein each alternative for each feature comprise one of performance-based variation and user-interface variation.

14. A system for facilitating automatic objective-based feature improvement, the system comprising:
one or more processors; and
a machine-readable medium comprising instructions stored therein, which when executed by the processors, cause the processors to perform operations comprising:
receiving an indication of a request to perform an experiment with respect a computer-implemented entity to identify an optimal alternative for each of one or more features of the computer-implemented entity, the optimal alternative comprising an alternative for each feature that provides the highest likelihood of resulting in an objective associated with the experiment;
determining, using the one or more computing devices, an alternative feature range with respect to each of the one or more features, the alternative feature range defining a range of possible alternative features available with respect to the feature;
selecting, using the one or more computing devices, a plurality of alternative features for each of the one or more features from the alternative feature range associated with the feature and generating a plurality of alternative sets, each alternative set including at least one alternative of the plurality of alternative features for at least one of the one or more features;

identifying a pool of users available to participate in the experiment;

generating a plurality of user groups by grouping the users of the identified pool of users, the plurality of user groups being generated based on the characteristics of each user of identified pool of users, wherein the number of user groups is equal to the number of alternative sets;

assigning, using the one or more computing devices, each user group of the plurality of users groups to one of the plurality of alternative sets, wherein the assigning is based on user characteristics of users of each user group; and receiving an indication of user activity of one or more users of each user group with respect to each of the alternative sets and generating an improvement score for each of the alternative sets based on the user activity.

15. The system of claim 14, the operations further comprising:

determining that a pre-defined condition with respect to the experiment has occurred during the experiment, wherein the pre-defined condition provides an indication that an adjustment to the experiment should be performed; and adjusting the plurality alternative sets determining that a pre-defined condition with respect to the experiment has occurred during the experiment, wherein the pre-defined condition provides an indication that an adjustment to the experiment should be performed.

16. The system of claim 15, the operations further comprising:

adjusting the plurality of alternative sets according to the improvement score for each of the plurality of alternative sets.

17. The system of claim 15, the operations further comprising:

adjusting the plurality users groups, the number of adjusted user groups of the plurality of adjusted user groups being equal to the number of adjusted alternative sets of the plurality of adjusted alternative sets; and assigning each adjusted user group of the plurality of adjusted users groups to one of adjusted alternative sets.

18. The system of claim 14, the operations further comprising:

generating an experiment feedback based on the calculated improvement score and providing the feedback for display.

19. A non-transitory machine-readable medium comprising instructions stored therein, which when executed by a machine, cause the machine to perform operations comprising:

receiving an indication of a request to perform an experiment with respect a computer-implemented entity to identify an optimal alternative for each of one or more features of the computer-implemented entity, the optimal alternative being an alternative having the highest correlation with an objective identified with respect to the computer-implemented entity;

automatically generating an experiment to determine the optimal alternative for each of the one or more features, the generating comprising:

determining, using the one or more computing devices, an alternative feature range with respect to each of the one or more features, the alternative feature range defining a range of possible alternative features available with respect to the feature;

selecting, using the one or more computing devices, a plurality of alternative features for each of the one or more features from the alternative feature range associated with the feature and generating a plurality of alternative sets, each alternative set including at least one alternative of the one or more alternative features for at least one of the one or more features;

identifying a pool of users available to participate in the experiment;

generating a plurality of user groups by grouping the users of the identified pool of users, the user groups being generated based on the characteristics of the users of identified pool of users, wherein the number of user groups is equal to the number of alternative sets; and assigning, using the one or more computing devices, each user group of the plurality of users groups to one of the plurality of alternative sets, wherein the assigning is based on user characteristics of the users of each user group;

receiving an indication of user activity for each of the users of the plurality user groups, for the duration of the experiment;

analyzing the received activity for each user group to determine and improvement score for the alternative set; and providing feedback regarding the optimal alternative for each of the one or more features when it is determined that the experiment has terminated based on analyzing the received user activity.

20. The machine-readable medium of claim 19, the operations further comprising:

adjusting the plurality of alternative sets according to the improvement score for each of the plurality of alternative sets during the experiment, the adjusting being performed in response to determining that a pre-defined condition with respect to the experiment has occurred during the experiment, wherein the pre-defined condition provides an indication that an adjustment to the experiment should be performed;

adjusting the plurality of users groups, the number of adjusted user groups of the plurality of adjusted user groups being equal to the number of adjusted alternative sets of the plurality of adjusted alternative sets;

assigning each adjusted user group of the plurality of adjusted users groups to one of adjusted alternative sets; and continuing the experiment according to the adjusted plurality alternative sets and the adjusted plurality adjusted user groups.

21. The machine-readable medium of claim 19, wherein the feedback for each of the one or more features comprises a determination of an optimal alternative for the feature, an indication that an optimal alternative is not determined for the feature or an indication that further experimentation is necessary to arrive at a determination of an optimal alternative for the feature.

* * * * *